United States Patent [19]

Freeny, Jr.

[11] Patent Number: 4,532,582

[45] Date of Patent: Jul. 30, 1985

[54] VOLTAGE REGULATOR SYSTEM USING MAGNETIC CONTROLLERS

[75] Inventor: Charles C. Freeny, Jr., Fort Worth, Tex.

[73] Assignee: Power Technology Partners, Ltd., Oklahoma City, Okla.

[21] Appl. No.: 465,822

[22] Filed: Feb. 14, 1983

[51] Int. Cl.³ .................... H02P 13/12

[52] U.S. Cl. .................... 363/90; 323/224; 323/232; 323/249; 363/91

[58] Field of Search .................... 323/220, 224, 232, 233, 323/247, 249, 250, 259, 329; 363/86, 90, 91

[56] References Cited

U.S. PATENT DOCUMENTS

| | | | |
|---|---|---|---|
| 1,836,886 | 12/1931 | Thompson | 323/232 |
| 3,122,699 | 2/1964 | Schohan | 323/232 |
| 3,270,270 | 8/1966 | Venisey | 363/86 |
| 4,302,805 | 11/1981 | Marez et al. | 323/214 |

FOREIGN PATENT DOCUMENTS

| | | | |
|---|---|---|---|
| 37309 | 6/1973 | Australia | 363/86 |

*Primary Examiner*—William H. Beha, Jr.
*Assistant Examiner*—Jeffrey Sterrett
*Attorney, Agent, or Firm*—Dunlap & Codding

[57] ABSTRACT

A voltage regulator system for receiving relatively high frequency electrical energy from a source and providing a regulated relatively low frequency electrical energy output wherein a passive device sensing means comprising only electrically passive elements senses the output voltage of the outputted relatively low frequency electrical energy and provides at least one output control signal proportional to the sensed output voltage, and at least one magnetic controller for receiving the control signal provided by the passive device sensing means and controllingly varying the relatively high frequency electrical energy in response to the received control signal to controllingly vary the voltage of the outputted relatively low frequency electrical energy to maintain the outputted relatively low frequency energy voltage at substantially a predetermined value.

22 Claims, 3 Drawing Figures

VOLTAGE REGULATOR SYSTEM USING MAGNETIC CONTROLLERS

BACKGROUND OF THE INVENTION

1. Field of the Invention

The present invention relates generally to voltage regulators for receiving relatively high frequency electrical energy from a source and providing a regulated relatively low frequency electrical energy output and, more particularly, but not by way of limitation, to a voltage regulator system wherein the outputted relatively low frequency electrical energy is sensed by a passive device sensing circuit comprising only electrically passive elements which provides at least one control signal for use in controlling at least one magnetic controller, the magnetic controller controllingly varying the electrical energy available via the relatively high frequency electrical energy source to controllingly vary the voltage of the outputted relatively low frequency electrical energy outputted for maintaining the outputted relatively low frequency electrical energy voltage at substantially a predetermined value.

2. Brief Description of the Prior Art

Reliable, low cost voltage regulation was difficult to achieve until relatively inexpensive solid state circuits became available. With the growth of the computer industry, the need for more reliable, inexpensive voltage regulator and control circuits has been created by the switching power supply technology. The pulsed width modulator circuits were fine for basic power regulation; however, it is not practical for individual voltage regulation to be accomplished with an inverter section associated with each output and, also, input and output isolation specifications are becoming even more important which makes solid state feedback circuits impractical unless optical coupling is utilized. Even where optical coupling is utilized, a special auxiliary power supply has been required.

DESCRIPTION OF THE PREFERRED EMBODIMENT

Figure 1:
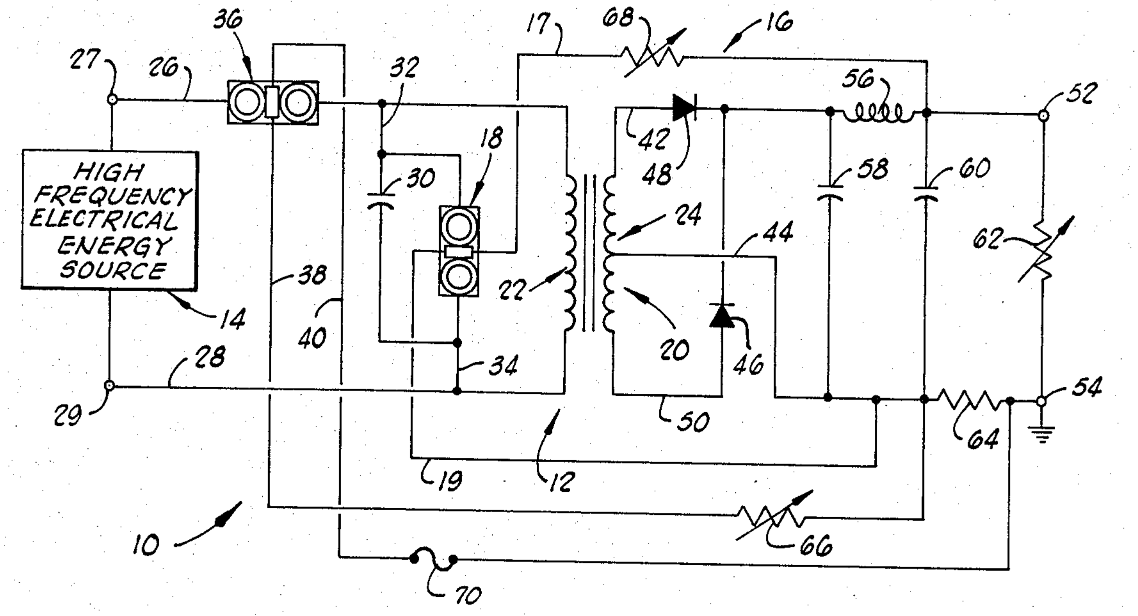
FIG. 1 is a schematic view of a voltage regulator which is constructed in accordance with the present invention.

Referring to the drawings in general, and to FIG. 1 in particular, shown therein and designated by the general reference numeral 10 is a voltage regulator system which is constructed in accordance with the present invention. In general, the voltage regulator system 10 includes a converter assembly 12 which is constructed and adapted to receive relatively high frequency electrical energy from a high frequency electrical energy source 14 and to convert the received relatively high frequency electrical energy for outputting a relatively low frequency electrical energy; a passive device sensing circuit 16 which comprises only electrically passive elements which is connected to the converter assembly 12 for sensing the energy of the outputted relatively low frequency electrical energy and providing at least one output control signal which is proportional to the sensed outputted energy; and at least one magnetic controller which is interposed between the converter assembly 12 and the high frequency electrical energy source 14 and includes a portion which is connected to the passive device sensing circuit 16, the magnetic controller receiving the control signal provided by the passive device sensing circuit 16 and controllingly varying the electrical energy available to the converter assembly 12 for controllingly varying the energy or voltage of the relatively low frequency electrical energy outputted via the converter assembly 12 to maintain the voltage of the outputted relatively low frequency electrical energy at substantially a predetermined value. As shown in FIG. 1, the voltage regulator system 10 includes a first magnetic controller 18 which is adapted to function in the manner just described with respect to the magnetic controller.

The first magnetic controller 18 is connected in electrical parallel with the source of relatively high frequency electrical energy 14 and the converter assembly 12. The first magnetic controller 18 includes a portion which is connected to the passive device sensing circuit 16 via conductors 17 and 19. The passive device sensing circuit 16 is constructed to provide a control signal and the first magnetic controller 18 receives the control signal from the passive device sensing circuit 16 via the conductors 17 and 19. The first magnetic controller 18 varies the electrical energy delivered to the converter assembly 12 via the relatively high frequency electrical energy source 14 to controllingly vary the energy of the relatively low frequency electrical energy outputted via the converter assembly 12 for maintaining the voltage of the outputted relatively low frequency electrical energy at substantially a predetermined value in a manner which will be described in greater detail below.

The converter assembly 12 includes a transformer 20 having primary windings 22 and secondary windings 24. The primary windings 22 of the transformer 20 are connected to the high frequency electrical energy source 14 via conductors 26 and 28 and input terminals 27 and 29. A capacitor 30 is connected in electrical parallel with the first magnetic controller 18 and the tank circuit comprising the first magnetic controller 18 and the capacitor 30 is connected in parallel with the primary windings 22 of the transformer 20, the tank circuit comprising the first magnetic controller 18 and the capacitor 30 being connected to the conductors 26 and 28 via conductors 32 and 34, respectively. It should be noted that the capacitor 30 may be the internal capacitance first magnetic controller 18 or the capacitor 30 may be a separate, external capacitor connected to the first magnetic controller 18 as shown in FIG. 1 depending on the design of the first magnetic controller 18 and the design of a particular voltage regulator system.

A second magnetic controller 36 is connected in electrical series with the source of relatively high frequency electrical energy 14 and the converter assembly 12. The second magnetic controller 36 includes a portion which is connected to the passive device sensing circuit 16 via conductors 38 and 40. The passive device sensing circuit 16 is constructed to provide another control signal on the conductors 38 and 40 and the second magnetic controller 36 receives this control signal from the passive device sensing circuit 16 via the conductors 38 and 40. The second magnetic controller 36 varies the electrical energy delivered to the converter assembly 12 via the relatively high frequency electrical energy source 14 to controllingly vary the energy of the relatively low frequency electrical energy outputted via the converter assembly 12 to cooperate with the first magnetic controller 18 in maintaining the outputted voltage of the relatively low frequency electrical energy at substantially a predetermined value in a manner which will be described in greater detail below.

The transformer 20 provides a secondary voltage output via the secondary windings 24 on conductors 42 and 44, the conductor 42 being connected to one end portion of the secondary windings 24 of the transformer 22 and the conductor 44 being connected to an appropriate intermediate portion of the secondary windings 24 of the transformer 22. A conductor 50 is connected to the opposite end of the secondary windings 24 and the conductor 50 is connected to the conductor 42. A diode 46 is interposed in the conductor 50 between the conductor 42 and the secondary windings 24 of the transformer 20. A diode 48 is interposed in the conductor 42 generally between the secondary winding 24 of the transformer 20 and the connection of the conductor 50 to the conductor 42. The diodes 46 and 48 are connected to the secondary windings 24 of the transformer 20 and adapted to rectify the secondary voltage provided via the secondary windings 24 of the transformer 20 on the conductors 42 and 44.

The ends of the conductors 42 and 44, opposite the ends which are connected to the secondary windings 24 of the transformer 20, are connected to output terminals 52 and 54, respectively. The relatively low frequency electrical energy outputted by the voltage regulator system 10 is provided at the output terminals 52 and 54. The output terminal 54 is connected to ground and, thus, the output terminal 52 is positive and the output terminal 54 is negative in the embodiment of the voltage regulator system 10 shown in FIG. 1, although this can be altered in a manner to be described in greater detail below.

A choke 56 is interposed in the conductor 42, generally between the secondary windings 24 of the transformer 20 and the output terminal 52. A capacitor 58 is connected to the conductors 42 and 44, the capacitor 58 being interposed between the choke 56 and the secondary windings 24 of the transformer 20. A capacitor 60 is connected to the conductors 42 and 44, the capacitor 60 being interposed generally between the choke 56 and the output terminals 52 and 54. The capacitors 58 and 60 cooperate with the choke 56 to provide a filter for filtering high frequency ripple energy in the rectified secondary voltage.

The transformer 20, the diodes 46 and 48, the choke 56 and the capacitors 58 and 60 comprise the converter assembly 12.

The regulated relatively low frequency electrical energy outputted via the voltage regulator system 10 at the output terminals 52 and 54 is available for use by a load. By way of illustration, a variable load (resistor) 62 is shown in FIG. 1 connected to the output terminals 52 and 54 of the voltage regulator system 10.

A resistor 64 is interposed in the conductor 44 generally between the output terminals 52 and 54 and the secondary winding 24 of the transformer 20. One end of the conductor 38 is connected to the conductor 44 and one end of the conductor 40 is connected to the conductor 44, the conductors 38 and 40 being connected to opposite sides of the resistor 64 so that the voltage across the resistor 64 is fed back via the conductors 38 and 40. The voltage across the resistor 64 is a sample (proportional to) of the low frequency electrical energy voltage outputted via the voltage regulator system 10 at the output terminals 52 and 54 when energy is being delivered to the load 62 and this sample voltage is fed back to the second magnetic controller 36 via the conductors 38 and 40 for controlling the second magnetic controller 36 in a manner which will be described in greater detail below.

One end of the conductor 17 is connected to the conductor 42 generally near the output terminal 52 and one end of the conductor 19 is connected to the conductor 44 generally near the output terminal 54. The voltage across the conductors 17 and 19 is proportional to the voltage provided at the output terminals 52 and 54 of the voltage regulator system 10.

A variable resistor 66 is interposed in the conductor 38 generally between the conductor 44 and the second magnetic controller 36. The variable resistor 66 functions to vary the control signal or current provided via the conductors 38 and 40 to the second magnetic controller 36.

A fuse may be interposed in the conductor 40 for local short circuit protection if desired in a particular application and a fuse 70 is shown in FIG. 1 interposed in the conductor 40.

A variable resistor 68 is interposed in the conductor 17 generally between the conductor 42 and the first magnetic controller 18. The variable resistor 68 functions to vary the control signal or current provided via the conductors 17 and 19 to the first magnetic controller 18 to controllingly vary the voltage of the first output control signal which is a voltage proportional to the voltage of the low frequency electrical energy outputted via the voltage regulator system 10 at the output terminals 52 and 54.

The resistor 64, the variable resistors 66 and 68 and the associated conductors 38 and 40 and 17 and 19 comprise the passive device sensing circuit 16 and it is a very important aspect of the present invention to note that each of the electrical devices or components in the passive device sensing circuit 16 is electrically passive or, in other words, each such component does not require an electrical power supply for its operation as would be required with electrically active components like transistors or operational amplifiers or the like.

The first magnetic controller 18 and the second magnetic controller 36 are special forms of saturable reactors, such special forms of saturable reactors being commercially available from Power Supply Technology Corporation of Fort Worth, Tex., and sold under Power Supply Technology Corporation's trademark "Magnistor". The Magnistor saturable reactor is described in U.S. Pat. No. 4,302,805, issued to Marez, et al. and the disclosure in this reference specifically is hereby incorporated by reference. It should be noted that, at the present time, the MAGNISTOR saturable reactor is the only commercially available electrical component suitable for functioning in the voltage regulator system 10 of the present invention as the first and second magnetic controllers 18 and 36.

The magnetic controller has two current windings, also known in the art as gate windings, and a control winding. As shown in FIG. 1 with respect to the first magnetic controller 18, one of the current windings of the first magnetic controller 18 is connected to the conductor 32 and the other current winding of the first magnetic controller 18 is connected to the conductor 34, the control winding of the first magnetic controller 18 being connected to the conductors 17 and 19. Thus, the control signal provided by the passive device sensing circuit on the conductors 17 and 19 is applied to the control windings of the first magnetic controller 18 and this control signal can be adjusted by varying the resistance of the resistor 68. The energy applied to the control windings of the first magnetic controller 18 controls the amount of energy transferred through the first magnetic controller 18 via the current windings.

As shown in FIG. 1 with respect to the second magnetic controller 36, one of the current windings of the second magnetic controller 36 is connected to the high frequency electrical energy source 14 and the other current winding of the second magnetic controller 36 is connected to the primary windings 22 of the transformer 20, the control winding of the second magnetic controller 36 being connected to the conductors 38 and 40. Thus, the control signal provided by the passive device sensing circuit 16 on the conductors 38 and 40 is applied to the control windings of the second magnetic controller 36 and this control signal can be varied by varying the resistor 66. The energy applied to the control windings of the second magnetic controller 36 controls the amount of energy transferred through the second magnetic controller 36 via the current windings.

The high frequency electrical energy source 14 normally provides a square wave output and the energy provided by the high frequency electrical energy source 14 is varied by pulse width modulating the square wave output. When the high frequency energy source 14 is supplying two or more voltage regulator systems 10, the pulse width of the high frequency energy source 14 could be controlled by summing in all operational amplifiers all of the average voltage drops across the various magnetic controllers 36 which might be supplied by the high frequency source 14. High frequency electrical energy sources are well known in the switching power supply art and a detailed description of such sources is not deemed necessary.

It should be noted that it is not necessary to include the second magnetic controller 36 unless a relatively large amount of energy is to be regulated by the voltage regulator system 10. Thus, one preferred embodiment of the voltage regulator system 10 includes only the first magnetic controller 18 and the passive device sensing circuit 16 is modified to provide only the control signal applied to the conductors 17 and 19. In this embodiment, the resistor 64, the variable resistor 66, the second magnetic controller 36 and the conductors 38 and 40 are eliminated.

In operation, high frequency electrical energy from the high frequency electrical energy source 14 is inputted to the voltage regulator system 10 via the input terminals 27 and 29 which are connected to the primary windings 22 of the transformer 20 and thus the high frequency electrical energy source 14 output signal is applied to the primary windings 22 of the transformer 20. The transformer 20 functions to provide a secondary voltage via the secondary windings 24 of the transformer 20, the output voltage of the transformer 20 being provided across the conductors 42 and 44. The secondary voltage provided by the transformer 20 is rectified via the diodes 46 and 48 and the high frequency ripple energy in the rectified transformer 20 output voltage is filtered by filter comprising the choke 56 and the capacitors 58 and 60. The resultant relatively low frequency electrial energy (the resultant direct current signal) which has been rectified and filtered then is available at the output terminals 52 and 54, the resultant relatively low frequency electrical energy being available to the load schematically represented by the variable resistor 62 in FIG. 1. A control signal which is proportional to the voltage regulator system 10 output at the output terminals 52 and 54 is fed back through the control windings of the first magnetic controller 18 via the conductors 17 and 19.

In initially adjusting or setting the voltage regulator system 10, the variable resistor 68 is varied and set at a resistance level so that, with a minimum or light load represented by the variable resistor 62 and a relatively low input voltage at the input terminals 27 and 29, the outputted relatively low frequency electrical energy applied at the output terminals 52 and 54 is at a predetermined, set level. For example, if the voltage regulator system 10 were to be adapted to supply and output relatively low frequency electrical energy voltage at the output terminals 52 and 54 of five volts DC, the variable resistor 68 is adjusted so that the output voltage at the output terminals 52 and 54 is five volts DC when the load or resistance value of the load variable resistor 62 is at a relatively high resistance value (normally called open circuit) and the voltage inputted by the high frequency electrical energy source 14 and applied at the input terminals 27 and 29 is at a minimum voltage level.

The "tuning" or "detuning" of the tank circuit comprised of the first magnetic, controller 18 and the capacitor 30 varies the impedance presented via the tank circuit comprising the first magnetic controller 18 and the capacitor 30. Thus, the tank circuit comprising the first magnetic controller 18 and the capacitor 30 functions to shunt a portion of electrical energy through such tank circuit thereby varying the amount of electrical energy which is connected to or applied to the primary windings 22 of the transformer 20. Thus, by varying the resistor 68 or, in other words, by varying the control signal applied to in the control windings of the first magnetic controller 18, the amount of electrical energy available at the primary windings 22 of the transformer 20 is controllingly varied thereby controllingly varying the secondary voltage.

After the variable resistor 68 has been adjustingly varied so that the output voltage of the voltage regulator system 10 provided at the output terminals 52 and 54 is at the predetermined, set output voltage when the load or resistor 62 is at a relatively high resistance value and the input voltage provided at the input terminals 27 and 29 is relatively low, then any decrease in voltage at the load resistor 62 or, in other words, any decrease in the voltage available at the output terminals 52 and 54 will cause the current flowing in the conductor 17 to be decreased thereby decreasing the current flowing in the control winding of the first magnetic controller 18. The decrease in current through the control winding of the first magnetic controller 18, raises the impedance of the tank circuit comprised of the first magnetic controller 18 and the capacitor 30 so that less energy is shunted through the tank circuit comprised of the first magnetic controller 18 and the capacitor 30 thereby causing proportionately more electrical energy to be applied to the primary windings 22 of the transformer 20 and consequently increasing the secondary voltage of the transformer 20 available at the output terminals 52 and 54. The current through the conductor 17 and thus through the control winding of the magnetic controller 18 will continue to decrease thereby continuing to cause the voltage applied to the primary windings 22 of the transformer 20 to increase resulting in increasing the output voltage at the output terminals 52 and 54. The output voltage applied to the output terminals 52 and 54 will continue to be increased in the manner just described (sometimes referred to as "increased control voltage regulation action") until the voltage at the output terminals 52 and 54 reaches the predetermined, set voltage value or until the tank circuit comprised of the first magnetic controller 18 and the capacitor 30 reaches its maximum impedance.

The sample resistor 64 (which could be just a section of fuse wire) and the variable resistor 66 are sized and adjusted, respectively, so that, when the tank circuit comprised of the first magnetic controller 18 and the capacitor 30 reaches its maximum impedance, the current flowing through the conductor 40 or, more particularly, through the control windings of the second magnetic controller 36 will begin to increase thereby lowering the impedance of the first magnetic controller 36 so that more of the energy inputted into the second magnetic controller 36 is passed through the second controller 36 and applied to the primary windings 22 of the transformer 20 or, in other words, so that the energy stored in the second magnetic controller 36 is delivered to the primary windings 22 of the transformer 20 thereby resulting in an increase in the secondary voltage or, in other words, resulting in an increase in the voltage applied at the output terminals 52 and 54.

As the load 62 increases or, in other words, as the resistance value of the load 62 decreases, the current flowing through the sample resistor 64 will increase thereby increasing the current through the conductor 40 or, more particularly, through the control windings of the second magnetic controller 36. As the current through the control windings of the second magnetic controller 36 increases, more energy is delivered through the second magnetic controller 36 and applied to the transformer 20 thereby increasing the secondary voltage ultimately applied at the output terminals 52 and 54.

The cooperation between the first magnetic controller 18 and the second magnetic controller 36 for regulating the output voltage applied at the output terminals 52 and 54 provides a voltage regulation system 10 wherein the outputted voltage is maintained regulated in a manner requiring very little feedback energy to be utilized during the regulation process. Thus, the voltage regulator system 10 of the present invention utilizes substantially less energy as compared to current or prior art voltage regulation circuits and, in addition, there is a somewhat automatic or inherent input-output electrical potential isolation between the input terminals 27 and 29 and the output terminals 52 and 54 of the voltage regulator system 10 of the present invention because such regulation is accomplished utilizing magnetic controllers 18 and 36.

As a further result, the voltage regulator system 10 as shown in FIG. 1 can be connected in series to one or more other voltage regulator systems which are constructed in accordance with the present invention as described before with respect to the voltage regulator system 10 to provide a flexibility in increasing the output voltage provided by the total number of voltage regulator systems.

In voltage regulator systems utilizing active electrical elements in the sensing and feedback circuits, the positive and the negative potentials at the output terminals are predetermined and fixed and cannot be switched or changed in a convenient or economical manner because the utilization of such active electrical elements in the sensing and feedback circuits requires the predetermined fixation of the positive and the negative potentials of the output terminals of such voltage regulator systems. In the present invention, because only passive electrical elements are utilized in the passive device sensing circuit 16, the positive and negative output terminals 52 and 54 can be changed by simply changing or reversing the ground connection presently shown at the output terminal 54 to output terminal 52. This reversal of the positive and negative nature of the output terminals is not possible with voltage regulator systems utilizing active electrical elements in the sensing and feedback circuits such as with transistor controlled elements in the sensing and feedback circuits even where such voltage regulator systems are optically coupled since polarity is very important to electrical potential devices such as transistors. However, the first and the second magnetic controllers 18 and 36 are unaffected by the polarity of the output terminals 52 and 54 and certainly the passive electrical elements in the passive device sensing circuit 16 are unaffected as far as performing their respective functions in the passive device sensing circuit 16 by the polarity of the output terminals 52 and 54.

In an operable embodiment, the value of the resistor 64 would be approximately or about 0.01 ohms and the resistance value of the variable resistor 66 would be much greater than the resistance value of the resistor 64. The resistance value of the variable resistor 68 would be in the range from about 100 ohms to about 1000 ohms and the resistance value of variable resistor 66 would be much less than the resistance value of the variable resistor 68. The impedance value of the second magnetic controller 36 in an unsaturated state would be approximately equal to the impedance value of the primary windings 22 of the transformer 20 and the impedance value of the first magnetic controller 36 in a saturated state would be much less than the impedance value of the primary windings 22 of the transformer 20. The impedance value of the tank circuit comprising the first magnetic controller 18 and the capacitor 30 in an unsaturated state of the first magnetic controller 18 is much greater than the impedance value of the primary windings 22 of the transformer 20. The impedance of the tank circuit comprising the first magnetic controller 18 and the capacitor 30 is much less than the impedance value of the primary windings 22 of the transformer 20 in a saturated state of the first magnetic controller 18.

Figure 2:
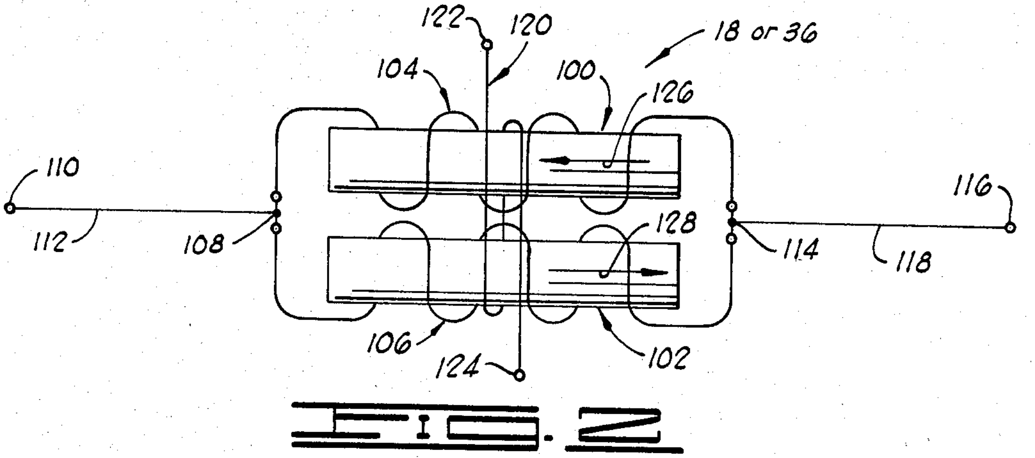
FIG. 2 is a schematic, diagrammatic view of a magnetic controller of the type which may be utilized in the voltage regulator shown in FIG. 1.

Embodiment of FIG. 2

As mentioned before, the first and the second magnetic controllers 18 and 36 each are special saturable reactor type of elements such as commercially available from Power Supply Technology Corporation and referred to as "MAGNISTOR saturable reactors", the construction and operation of such special saturable reactors being described in U.S. Pat. No. 4,302,805, issued to Marez, et al., referred to before. Shown in FIG. 2 is a modified MAGNISTOR saturable reactor with respect to the MAGNISTOR saturable reactor shown and described in U.S. Pat. No. 4,302,805, issued to Marez, et al., in which at least two toroids 100 and 102 are wound in a particular manner as illustrated in FIG. 2.

The toroid 100 has a current winding 104 which is wound about the toroid 100 in a clockwise direction and the toroid 102 includes a current winding 106 which extends about the toroid 102 in the counterclockwise direction. One end of the current winding 104 is connected to one end of the current winding 106 at a terminal 108, and the current windings 104 and 106 are connected to a terminal 110 via a conductor 112. The opposite end of the current winding 104 is connected to the opposite end of the current winding 106 at a terminal 114, and the current windings 104 and 106 are connected to a terminal 116 via a conductor 118.

One end of a control winding 120 is connected to a terminal 122 and the opposite end of the control winding 120 is connected to a terminal 124. The control winding 120 is wound about both of the toroids 100 and 102.

The toroids 100 and 102 are constructed of a similar ferrite material and the number of turns of the current winding 104 about the toroid 100 is the same as the number of turns of the current winding 106 about the toroid 102; however, the current winding 104 about the toroid 100 is in the clockwise direction and the current winding 106 about the toroid 102 is in the counterclockwise direction. In a particular application it only is important that the current winding 104 about the toroid 100 is in a direction opposite to the direction of the current winding 106 about the toroid 102 and the number of turns of the current winding 104 about the toroid 100 is substantially the same as the number of turns of the current winding 106 about the toroid 102.

The clockwise current winding 104 about the toroid 100 produces a flux in one direction as indicated via the arrow 126 in FIG. 2 and the counterclockwise current winding 106 about the toroid 102 produces a flux in a direction indicated by the arrow 128 in FIG. 2. The flux produced via the current winding 104 about the toroid 100 in the direction 126 is opposite the direction of flux produced by the current winding 106 about the toroid 102 in the direction 128. The current winding 104 about the toroid 100 is in parallel with the current winding 106 about the toroid 102 and the current windings 104 and 106 are produced in essence by splitting the conductor 112 and then reconnecting the current windings 104 and 106 at the terminal 114 to the conductor 118. In other words, the conductor used to produce current winding 104 has essentially the same diameter and essentially the same length as the conductor used to produce the current winding 106, and diameter of each of the conductors used to produce the current windings 104 and 106 is about one-half the diameter of either of the conductors 112 and 118. Thus the EMF across the toroid 100 always is equal to the EMF produced across the toroid 102.

The control winding 120 is wound about both toroids 100 and 102 in a direction generally perpendicular to the current windings 104 and 106. Thus, the induced voltage in the control winding 120 is produced by the magnetic flux induced via the current windings 102 and 104 as indicated by the arrows 126 and 128 and, since the induced voltages produced by the current windings 102 and 104 are equal and opposite, there will be no net voltage produced between the terminals 122 and 124 even though the toroids 100 and 102 might have slightly different magnetic properties in an actual embodiment. Because of this, the first and the second magnetic controllers 36 and 18 each have relatively low inductance and isolation potential between the current windings 102 and 104 and the control winding 120 and this is not the case with other types of saturable reactors.

The toroid 100 is axially co-located with respect to the toroid 102 as shown in FIG. 2. This geometry is different with respect to the coplanar toroid geometry of the MAGNISTOR saturable reactor described in U.S. Pat. No. 4,302,805, issued to Marez, et al. This new geometry as shown in FIG. 2 provides a significant practical improvement since the control winding 120 now can be placed over both toroid 100 and 102 using an automatic toroid winding machine which was not possible with the coplanar toroid geometry shown in U.S. Pat. No. 4,302,805, issue to Marez, et al. Also, the coaxial toroid geometry shown in FIG. 2 permits a different form factor for the MAGNISTOR saturable reactor package and allows a better, more efficient regulator packaging geometry.

Figure 3:
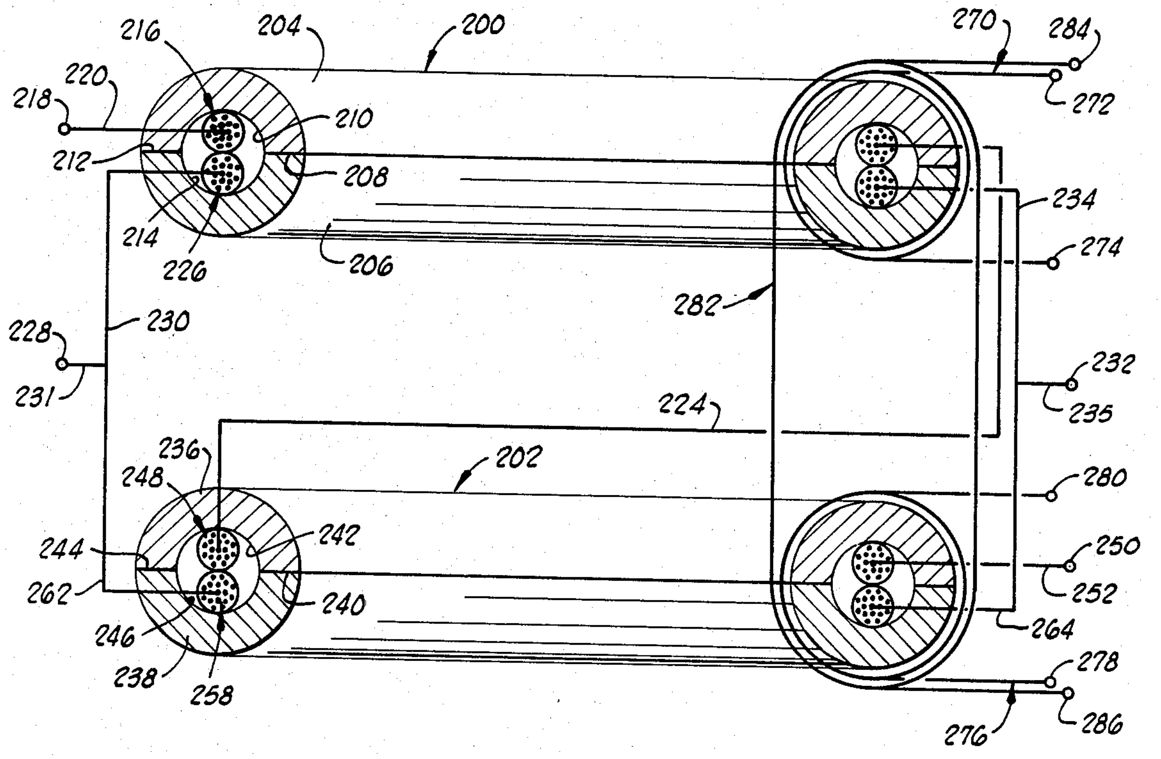
FIG. 3 is a view similar to FIG. 2, but showing a modified magnetic controller.

Embodiment of FIG. 3

Shown in FIG. 3 is another MAGNISTOR saturable reactor first or second magnetic controller which may be utilized as the magnetic controllers 18 and 36 in the voltage regulator system 10 of the present invention.

The core 200 includes a first core section 204 and a second core section 206. The first core section 204 is circularly shaped and has a half-circle cross-section providing a substantially flat mating face 208 extending circumferentially about the first core section 204. The mating face 208 is substantially flat while the remaining portion of the first core section 204 in cross-section extends circularly about the mating face 204 on a radius extending radially outwardly from the center of the mating face 208 to the outer peripheral surface of the rounded portion of the first core section 204. A recess 210 is formed in a central portion of the mating face 208 and the recess 210 extends circumferentially about the first core section 204.

The second core section 206 is circularly shaped and has a half-circle cross-section providing a substantially flat mating face 212 extending circumferentially about the second core section 206. The mating face 212 is substantially flat while the remaining portion of the second core section 206 in cross-section extends circularly about the mating face 212 on a radius extending radially outwardly from the center of the mating face 212 to the outer peripheral surface of the rounded portion of the second core section 206. A recess 214 is formed in the central portion of the mating face 212 and the recess 214 extends circumferentially about the mating face 212, the recess 214 thus extending circumferentially about the second core section 206.

In one preferred form, the first and the second core sections 204 and 206 are identical in construction and the mating face 208 of the first core section 204 is shaped and adapted to matingly engage the mating face 212 of the second core section 206 to form the toroid-shaped first core 200, as shown in FIG. 3. In the connected position with the mating face 208 matingly engaging the mating face 212, the recess 210 in the first core section 204 is aligned with the recess 214 in the second core section 206. The first and the second core sections 204 and 206 can be constructed by starting with a toroid-shaped first core 200 and splitting the toroid-shaped first core 200 along the central, horizontal-located diameter. In the alternative, the first and the second core sections 204 and 206 each can be constructed separately and then the two core sections 204 and 206 can be combined to form the toroid-shaped first core 200. Also, it should be noted that the first and the second core sections 204 and 206 could be constructed by starting with a toroid shaped first core 200 and splitting the toroid-shaped first core 200 along some other diameter, such as a central, vertical-located diameter.

A control winding 216 is disposed in the space provided by the recesses 210 and 214. The control winding 216 has opposite ends and one end of the control winding 216 is connected to a teriminal 218 via a conductor 220 and the opposite end of the control winding 216 is connected to a conductor 224. The control winding 216, more particularly, comprises a coil of wire. In one preferred method of constructing the magnetic controller, the coil of wire (control winding 216) is constructed of a predetermined number of turns of current conducting wire and potted (embedded in insulating material), with one end portion of the potted coil of wire (control winding 216) being connected to the terminal 218 and forming the conductor 220 and the opposite end of the potted coil of wire (control winding 216) forming the conductor 224.

A current winding 226 also is disposed in the space provided by the recesses 210 and 214. The current winding 226 has opposite ends and one end of the current winding 226 is connected to a terminal 228 via conductors 230 and 231 and the opposite end of the current winding 226 is connected to a terminal 232 via conductors 234 and 235. The current winding 226, more particularly, comprises a coil of wire. In one preferred method of constructing the magnetic controller, the coil of wire (current winding 226) is constructed of a predetermined number of turns of current conducting wire and potted (embedded in insulating material), with one end portion of the potted coil of wire (current winding 226) being connected to the terminal 228 and forming the conductor 230 and the opposite end of the potted coil of wire (current winding 226) being connected to the terminal 232 and forming the conductor 234.

After the coils of wire comprising the control winding 216 and the current winding 226 have been constructed and potted, the potted coils of wire (control winding 216 and current winding 226) are disposed generally within the recess 214 formed in the second core section 206 and, then, the first core section 204 is placed on the second core section 206 with the mating face 208 of the first core section 204 matingly engaging the mating face 212 of the second core section 206, the recess 210 of the first core section 204 being disposed about portions of the potted coils of wire (control winding 216 and current winding 226) extending generally above the mating face 212 of the second core section 206. In this assembled position, the recesses 210 and 214 cooperate to encompass and retain the potted coils of wire (control winding 216 and current winding 226). It should be noted that the conductors 220 and 224 portions of the coil of wire (control winding 216) and the conductor portions 230 and 234 of the potted coil of wire (current winding 226) each, respectively, cooperate in conducting current and cooperate to connect the coils of wire (control winding 216 and current winding 226) to the respective terminals 228 and 232. However, virtually all of the control winding 216 and the control winding 226 are disposed within and extend through a central portion of the first core 200 such that the first core 200 extends about and generally encompasses the control winding 216 and the current winding 226. Although the control winding 216 and the current winding 226 generally will include the conductor portions 220, 224, 230 and 234, respectively, as integral portions thereof in a physical embodiment, the terms "control winding" and "current winding", as used herein, refer only to the portions of the coils of wire which are disposed in and extend through a central portion of the first core 200.

After the first and the second core sections 204 and 206 have been positioned in a mating position with the potted coils of wire (control winding 216 and current winding 226) disposed therebetween in the recesses 210 and 214, respectively, the first and the second core sections 204 and 206 then are fused together by chemical means in such a manner that no effective air gap is left between the first and the second core sections 204 and 206, thereby forming the completed toroid-shaped first core 200 having the control winding 216 and the current winding 226 disposed in the central portion thereof and extending circumferentially thereabout with the first core 200 extending generally about and encompassing the control winding 216 and the current winding 226.

The core 202 is constructed similar to the core 200 and, in a preferred form, the cores 200 and 202 are identical in construction. The second core 202 includes a first core section 236 and a second core section 238. The first core section 236 is circularly shaped and has a half-circle cross-section providing a substantially flat mating face 240 extending circumferentially about the first core section 236. The mating face 240 is substantially flat while the remaining portion of the first core section 236 in cross-section extends circularly about the mating face 240 on a radius extending radially outwardly from the center of the mating face 240 to the outer peripheral surface of the rounded portion of the first core section 236. A recess 242 is formed in a central portion of the mating face 240 and the recess 242 extends circumferentially about the first core section 236.

The second core section 238 is circularly shaped and has a half-circle cross-section providing a substantially flat mating face 244 extending circularly about the second core section 238. The mating face 244 is substantially flat while the remaining portion of the second core section 238 in cross-section extends circumferentially about the mating face 244 on a radius extending radially outwardly from the center of the mating face 244 to the outer peripheral surface of the rounded portion of the second core section 238. The recess 246 is formed in the central portion of the mating face 244 and the recess 246 extends circumferentially about the mating face 244, the recess 246 thus extending circumferentially about the second core section 238.

In one preferred form, the first and the second core sections 236 and 238 are identical in construction and the mating face 240 of the first core section 236 is shaped and adapted to matingly engage the mating face 244 of the second core section 238 to form the toroid-shaped second core 202, as shown in FIG. 3. In the connected position with the mating face 240 matingly engaging the mating face 244, the recess 242 in the first core section 236 is aligned with the recess 246 in the second core section 238. The first and the second core sections 236 and 238 can be constructed by starting with a toroid-shaped second core 202 and splitting the toroid-shaped second core 202 along the central, horizontal-located diameter. In the alternative, the first and the second core sections 236 and 238 each can be constructed separately and then the two core sections 236 and 238 can be combined to form the toroid-shaped second core 202. Also, it should be noted that the first and second core sections 236 and 238 would be constructed by starting with a toroid-shaped second core 202 and splitting the toroid-shaped second core 202 along some other diameter, such as a central, vertical-located diameter.

A control winding 248 is disposed in the space provided by the recesses 242 and 246. The control winding 248 has opposite ends and one end of the control winding 248 is connected to a terminal 250 via a conductor 252 and the opposite end of the control winding 248 is connected to the conductor 224. The control winding 248, more particularly, comprises a coil of wire. In one preferred method of constructing the magnetic controller, the coil of wire (control winding 248) is constructed of a predetermined number of turns of current conducting wire and potted (embedded in insulating material), with one end portion of the potted coil of wire (control winding 248) being connected to the terminal 250 and forming the conductor 252 and the opposite end of the potted coil of wire (control winding 248) cooperating to form the conductor 224.

The current winding 258 also is disposed in the space provided by the recesses 242 and 246. The current winding 258 has opposite ends and one end of the current winding 258 is connected to the terminal 228 via conductors 262 and 231 and the opposite end of the current winding 258 is connected to the terminal 232 via conductors 264 and 235. The current winding 258, more particularly, comprises a coil of wire. In one preferred method of constructing the magnetic controller, the coil of wire (current winding 258) is constructed of a predetermined number of turns of current conducting wire and potted (embedded in insulating material), with one end portion of the potted coil of wire (current winding 258) being connected to the terminal 228 and forming the conductor 262 and the opposite end of the potted coil of wire (current winding 258) being connected to the terminal 232 and forming the conductor 264.

After the coils of wire comprising the control winding 248 and the current winding 258 have been constructed and potted, the potted coils of wire (control winding 248 and current winding 258) are disposed generally within the recess 246 formed in the second core section 238 and, then, the first core section 236 is placed on the second core section 238 with the mating face 240 of the first core section 236 matingly engaging the mating face 244 of the second core section 238, the recess 242 of the first core section 236 being disposed about a portion of the potted coils of wire (control winding 248 and current winding 258) extending generally above the mating face 244 of the second core section 238. In this assembled position, the recesses 242 and 246 cooperating to encompass and retain the potted coils of wire (control winding 248 and current winding 258). It should be noted that the conductors 252 and 224 portions of the coil of wire (control winding 248) and the conductor portions 262 and 264 of the potted coil of wire (current winding 258) each, respectively cooperate in conducting current and cooperate to connect the coils of wire (control winding 248 and current winding 258) to the respective terminals 228, 232 and 250. However, virtually all of the control winding 248 and the current winding 258 are disposed within and extend through a central portion of the second core 202 such that the second core 202 extends about and generally encompasses the control winding 248 and the current winding 258. As mentioned before with respect to the first core 200, the terms "control winding" and "current winding" as used herein, refer only to the portions of the coils of wire which are disposed in and extend through a central portion of the second core 202.

After the first and the second core sections 236 and 238 have been positioned in a mating position with the potted coils of wire (control winding 248 and current winding 258) disposed therebetween in the recesses 242 and 246, respectively, the first and the second core sections 236 and 238 then are fused together by chemical means in such a manner that no effective air gap is left between the first and the second core sections 236 and 238, thereby forming the completed toroid-shaped second core 202 having the control winding 248 and the current winding 258 disposed in the central portion thereof and extending circumferentially thereabout with the second core 202 extending generally about and encompassing the control winding 248 and the current winding 258.

The toroid-shaped first and second cores 200 and 202 are constructed of a similar ferrite material. The number of turns of the current winding 226 in the first core 200 is substantially the same as the number of turns in the current winding 258 in the second core 202; however, the current winding 226 extends about the first core 200 in the clockwise direction and the current winding 248 extends about the second core 202 in the counterclockwise direction. In a particular application, it only is important that the current winding 226 extends about the first core 200 in a direction, opposite to the direction in which the current winding 258 extends about the second core 202 and the number of turns of the current winding 226 in the first core 200 is substantially the same as the number of turns of the current winding 258 in the second core 202.

The clockwise current winding 226 about the first core 200 produces a flux in one direction and the counterclockwise current winding 258 about the second core 202 produces a flux in an opposite direction. The flux produced by the current winding 226 in the first core 200 is opposite the direction of the flux produced by the current winding 258 in the second core 202. The current winding 226 in the first core 200 is connected in electrical parallel with the current winding 258 in the second core 202 and the conductor used to produce the current winding 226 in the first core 200 has essentially the same diameter and essentially the same length as the conductor used to produce the current winding 258 in the second core 202, and the diameter of each of the conductors used to produce the current windings 226 and 258 is about one-half of the diameter of either of the conductors 231 and 235. Thus, the EMF across the first core 200 always is equal to the EMF produced across the second core 202.

The current windings 226 and 258 are connected in parallel. The control windings 216 and 248 are wound in the same direction and are connected in series with one end of the control winding 216 being connected to the terminal 218 and the opposite end of the control windings 216 being connected to one end of the control winding 248 and with the opposite end of the control winding 248 being connected to the terminal 250. The induced voltage in the control windings 216 and 248 is produced by the magnetic flux induced via the current windings 226 and 258 and, since the induced voltages produced by the current windings 226 and 258 are equal and opposite, there will be no net voltage produced between the terminals 218 and 250 even though the toroid cores 200 and 202 might have slightly different properties in an actual embodiment. Because of this, the magnetic controllers, constructed as shown in FIG. 3, each have relatively low inductance and isolation potential between the current windings 226 and 258 and the control windings 216 and 248.

It is believed that the construction of the cores 200 and 202, as shown in FIG. 3, with the control windings 216 and 248 and the current windings 226 and 258 extending through central portions of the respective cores 200 and 202 will result in more energy stored for a given volume of core material. This particular construction does result in a much more efficient manufacturing procedure since the control and current windings 216, 248, 222 and 258 can be wound on standard coil winding machines and then assembled in the cores 200 and 202.

The magnetic controller also can include a pole magnet current winding 270 which is wrapped about the outer peripheral surface portion of the toroid-shaped first core 200. One end of the pole magnet current winding 270 is connected to a terminal 272 and the opposite end of the pole magnet current winding 270 is connected to a terminal 274.

A pole magnet current winding 276 is wrapped about the outer peripheral surface portion of the toroid-shaped second core 202. One end of the pole magnet current winding 276 is connected to a terminal 278 and the opposite end of the pole magnet winding 276 is connected to a terminal 280.

A pole magnet control winding 282 is wrapped about a portion of both the first and the second cores 200 and 202. One end of the pole magnet control winding 282 is connected to a terminal 284 and the opposite end of the pole magnet control winding 282 is connected to a terminal 286.

The pole magnet current windings 270 and 276 are constructed and wound about the first and second cores 200 and 202, respectively, in a manner exactly like that described before with respect to the current windings 104 and 106, shown in FIG. 2. The pole magnet control winding 282 is wound about the two cores 200 and 202 in a manner exactly like that described before with respect to the control windings 120, shown in FIG. 2. The pole magnet control windings 282 is connected in series with the control windings 216 and 258, the pole magnet current winding 270 is connected in series with either of the current windings 226 or 258 (not shown), and the pole magnet current winding 282 is connected in series with either of the current windings 226 or 258 (not shown). Thus, the pole magnet current and control windings 270, 276 and 282 are wrapped about the toroid cores 200 and 202 in the usual manner and, thus, the pole magnet current and control windings 270, 276 and 282 do not have the ease of construction aspects which accompany the control and current windings 216, 248, 226 and 258. However, the addition of the pole magnet current and control windings 270, 276 and 282 may result in even more energy stored per unit volume core material.

Changes may be made in the construction and operation of the various elements described herein or in the steps or the sequence of steps of the methods described herein without departing from the spirit and the scope of the invention as defined in the following claims.

What is claimed is:

1. A voltage regulator system for receiving relatively high frequency electrical energy from a source and providing a regulated relatively low frequency electrical energy output, comprising:

a converter means for receiving the relatively high frequency electrical energy and converting the received relatively high frequency electrical energy and outputting a relatively low frequency electrical energy output;

a passive device sensing means comprising only electrically passive components connected to the converter means for sensing the voltage of the relatively low frequency electrical energy outputted via the converter means and providing output control signals indicative of the sensed output voltage;

a first magnetic controller having current windings and control windings, the current windings of the first magnetic controller being connected in electrical parallel with the converter means and the source of relatively high frequency electrical energy and the control windings of the first magnetic controller receiving one of the control signals from the passive device sensing means; and a second magnetic controller having current windings and control windings, the current windings of the second magnetic controller being connected in electrical series between the converter means and the source of relatively high frequency electrical energy and the control windings of the second magnetic controller receiving one of the control signals from the passive device sensing means, the first and the second magnetic controllers receiving the control signals from the passive device sensing means and cooperating to controllingly vary the voltage of the relatively low frequency electrical energy outputted via the converter means to maintain the outputted relatively low frequency electrical energy voltage at substantially a predetermined value.

2. The voltage regulator of claim 1 wherein the converter means is defined further to include: a transformer having primary windings and secondary windings, the source of relatively high frequency electrical energy being connected to the primary windings of the transformer.

3. The voltage regulator of claim 2 wherein the first magnetic controller is defined further as having at least two current windings and a control winding, the control winding of the first magnetic controller being connected to the passive device sensing means.

4. The voltage regulator system of claim 3 wherein the current windings of the first magnetic controller are defined further as being connected in electrical parallel with the primary windings of the transformer.

5. The voltage regulator of claim 2 wherein the converter means is defined further to include:

means connected to the secondary winding of the transformer for rectifying the voltage produced on the secondary windings of the transformer; and means for filtering the rectified voltage produced on the secondary windings of the transformer.

6. The voltage regulator system of claim 5 wherein the rectified and filtered voltage from the secondary winding of the transformer is connected to output terminals, the regulated relatively low frequency electrical energy outputted via the voltage regulator being provided at the output terminals, and wherein the passive device sensing means is defined further to include:

a variable resistor connected to the output terminals and to the control windings of the first magnetic controller.

7. The voltage regulator system of claim 6 defined further to include:

a capacitor connected in electrical parallel to the current windings of the first magnetic controller, the first magnetic controller and the capacitor cooperating to provide a tank circuit wherein the impedance of the tank circuit is controlled by varying the current through the control windings.

8. The voltage regulator system of claim 2 wherein the second magnetic controller is defined further as having at least two current windings and a control winding; and wherein the passive device sensing means is defined to include a sample resistor connected in series with at least one of two output terminals, the voltage across the sample resistor being related to the voltage outputted at the output terminals and the voltage across the sample resistor being connected to the control windings of the second magnetic controller.

9. The voltage regulator system of claim 8 wherein the passive device sensing means is defined further to include a variable resistor connected between the sample resistor and the control windings of the second magnetic controller.

10. The voltage regulator of claim 8 wherein one end of the current windings of the second magnetic controller is connected to the primary windings of the transformer and the other end of the current winding of the second magnetic controller is connected to the source of relatively high frequency electrical energy, the current windings of the second magnetic controller being connected in electrical series to the primary windings of the transformer.

11. The voltage regulator system of claim 1 wherein at least one of the first and second magnetic controllers is defined further to include:

a first core constructed of a magnetic material;

a control winding extending through the first core and the first core encircling the control winding substantially along the entire length of the control winding;

a current winding extending through the first core and the first core encircling the current winding substantially along the entire length of the current winding at least one of;

a second core constructed of a first and second magnetic material;

a control winding extending through the second core and the second core encircling the control winding substantially along the entire length of the control winding; and a current winding extending through the second core and the second core encircling the current winding substantially along the entire length of the current winding.

12. The magnetic controller of claim 11 wherein the control winding in the first core is connected in series with the control winding in the second core, and wherein the current winding in the first core is connected in parallel with the current winding in the second core.

13. The magnetic controller of claim 12 wherein the current winding in the first core comprises a coil of wire having a predetermined number of turns and wound in one direction with respect to the first core; and wherein the current winding in the second core comprises a coil of wire having a predetermined number of turns and wound in one direction with respect to the second core, the current winding in the first core being wound in an opposite direction with respect to the current winding in the second core.

14. The magnetic controller of claim 11 defined further to include:

a pole magnet current winding wound in one direction about the first core;

a pole magnet current winding wound in one direction about the second core, the pole magnet current winding being wound about the first core in an opposite direction with respect to the direction of the pole magnet current winding wound about the second core; and a pole magnet control winding wound about the first and second cores.

15. The magnetic controller of claim 11 wherein the first core is defined further as comprising:

a first core section having a mating face with a recess formed in the mating face adapted to receive a portion of the control winding and the current winding; and a second core section having a mating face with a recess formed in the mating face adapted for receiving a portion of the control winding and the current winding, the mating face of the second core section matingly engaging the mating face of the first core section in an assembled position of the first and the second core sections with the control winding and the current winding being disposed in the space provided by the recesses in the first and second core sections; and wherein the second core is defined further as comprising:

a first core section having a mating face with a recess formed in the mating face adapted to receive a portion of the control winding and the current winding; and a second core section having a mating face with a recess formed in the mating face adapted for receiving a portion of the control winding and the current winding, the mating face of the second core section matingly engaging the mating face of the first core section in an assembled position of the first and the second core sections with the control winding and the current winding being disposed in the space provided by the recesses in the first and second core sections.

16. The magnetic controller of claim 15 wherein the first core is defined further as being toroid-shaped and wherein the first core section is defined further as comprising about one-half of the toroid-shaped first core; and wherein the second core section is defined further as comprising about one-half of the toroid-shaped first core, the first and the second core sections comprising the toroid-shaped first core in an assembled position of the first and the second core sections; and wherein the second core is defined further as being toroid-shaped and wherein the first core section is defined further as comprising about one-half of the toroid-shaped core; and wherein the second core section is defined further as comprising about one-half of the toroid-shaped core, the first and the second core sections comprising the toroid-shaped second core in an assembled position of the first and second core sections.

17. The magnetic controller of claim 16 wherein the mating surfaces of the first and the second core sections of the first core are each defined further as being disposed in a plane about coplanar with a horizontal centerline extending through the toroid-shaped first core in an assembled position of the first and the second core sections; and wherein the mating surfaces of the first and second core sections of the second core are each defined further as being disposed in a plane about coplanar with a horizontal centerline extending through the toroid-shaped second core in an assembled position of the first and the second core sections.

18. A voltage regulator method of receiving relatively high frequency electrical energy from a source and providing a regulated relatively low frequency electrical energy output, comprising the steps of:

converting the relatively high frequency electrical energy and outputting a relatively low frequency electrical energy;

sensing, with only electrically passive components, the output voltage of the outputted relatively low frequency electrical energy and providing output control signals indicative of the sensed output voltage;

receiving one of the control signals via a first magnetic controller, the first magnetic controller having control windings receiving the control signal and having current windings connected in electrical parallel with the source of relatively high frequency electrical energy and the converting means; and receiving one of the control signals via a second magnetic controller, the second magnetic controller having control windings receiving the control signal and having current windings connected in electrical series with the source of relatively high frequency electrical energy and the converting means, the first and second magnetic controllers receiving the control signals from the passive device sensing means and cooperating to controllingly vary the electrical energy of the relatively high frequency electrical energy available for converting to the outputted relatively low frequency electrical energy for maintaining the voltage of the outputted relatively low frequency electrical energy at substantially a predetermined value.

19. The method of claim 18 wherein the step of converting the relatively high frequency electrical energy is defined further to include the step of:

inputting the controlled relatively high frequency electrical energy to the primary windings of a transformer having primary and secondary windings.

20. The voltage regulator method of claim 19 wherein the step of receiving one of the control signals with the first magnetic controller is defined further to include controlling the energy delivered to the primary windings of the transformer with the first magnetic controller connected in parallel with the primary windings of the transformer, the first magnetic controller receiving one of the control signals and controllingly varying the amount of energy delivered to the primary windings of the transformer via the relatively high frequency electrical energy in response to the received control signal to controllingly vary the voltage of the outputted relatively low frequency electrical energy.

21. The method of claim 19 wherein the step of converting the relatively high frequency electrical energy is defined further to include the steps of:

rectifying the voltage received from the secondary windings of the transformer; and filtering the rectified voltage to produce the outputted relatively low frequency electrical energy of the voltage regulator system.

22. The voltage regulator method of claim 21 wherein the step of receiving one of the control signals with the second magnetic controller is defined further to include controlling via a second magnetic controller connected in series with the primary windings of the transformer the energy of the relatively high frequency electrical energy delivered to the primary windings of the transformer, the second magnetic controller receiving one of the control signals and controllingly varying the amount of energy delivered to the primary windings of the transformer via the relatively high frequency electrical energy in response to the received control signal.

* * * * *